July 14, 1959  V. A. POVSE ET AL  2,894,281
MOLDING PRESS
Filed May 5, 1955  4 Sheets-Sheet 3

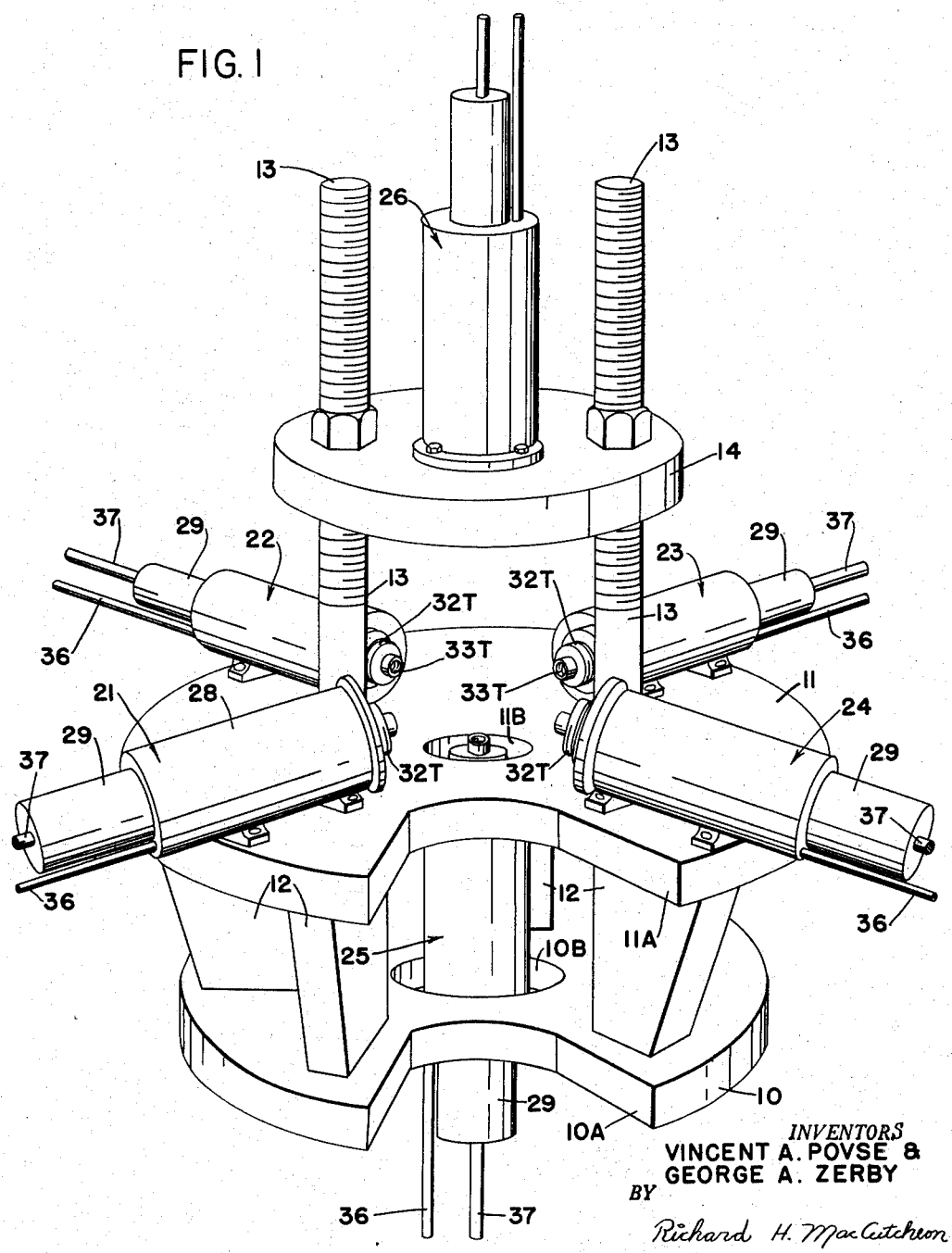

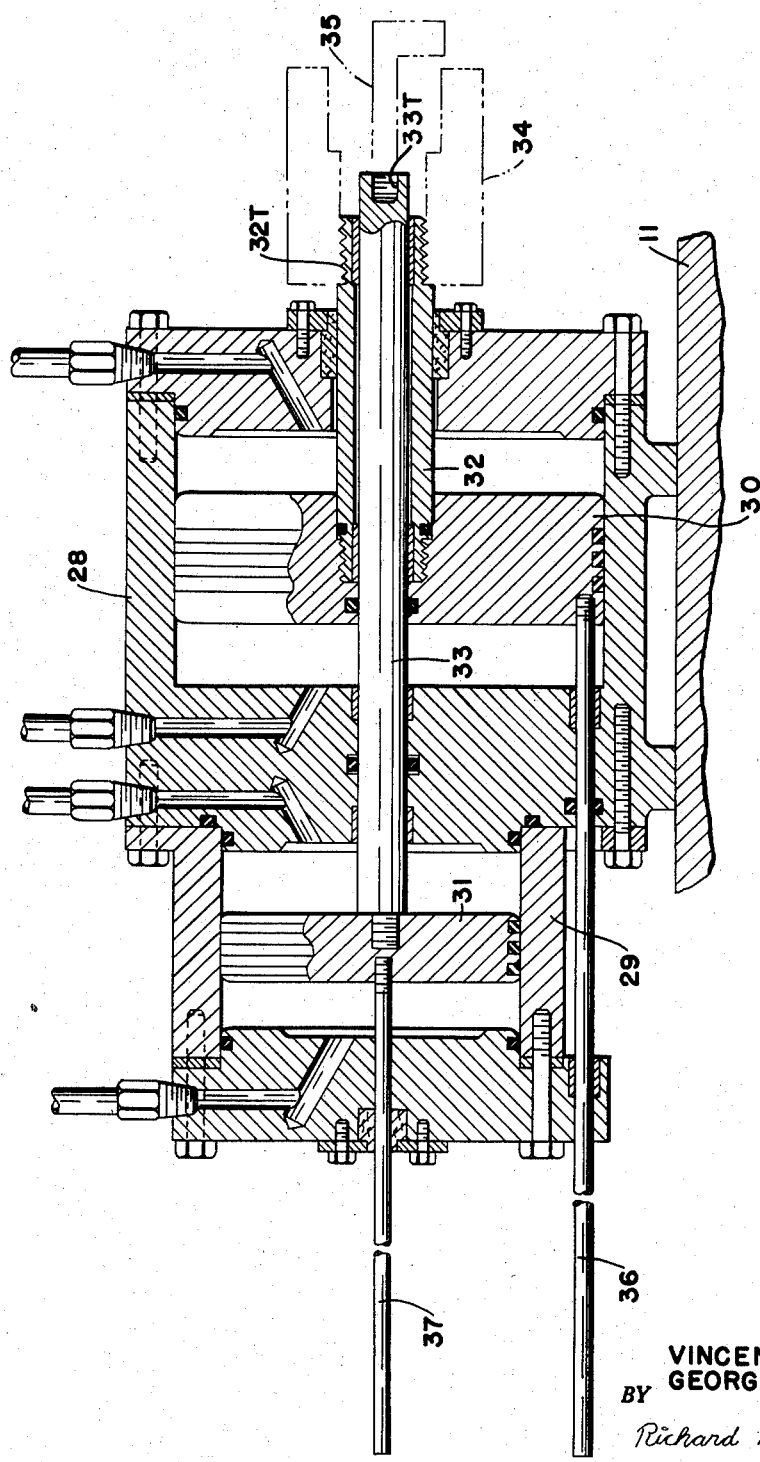

INVENTORS
VINCENT A. POVSE &
GEORGE A. ZERBY
BY
Richard H. MacCutcheon
ATTORNEY

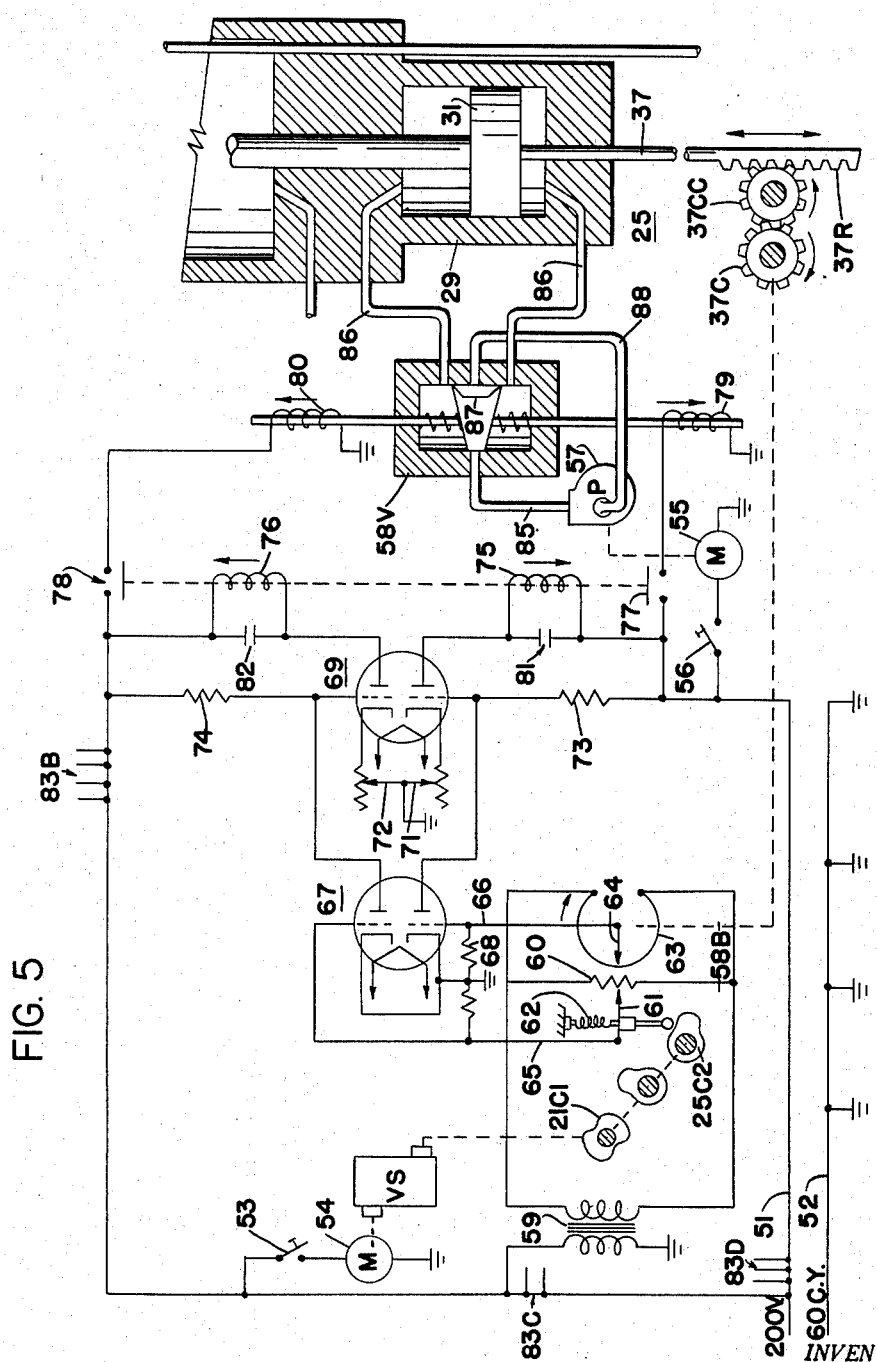

United States Patent Office 2,894,281
Patented July 14, 1959

2,894,281
MOLDING PRESS

Vincent Anton Povse, Wickliffe, and George A. Zerby, Cleveland, Ohio, assignors to Bar Products Company, Cleveland, Ohio, a corporation of Ohio Application May 5, 1955, Serial No. 506,286

5 Claims. (Cl. 18—16)

This invention relates to press mechanism useful in powder metallurgy but not limited thereto and believed useful also in connection with the molding of plastics.

In order to form metal powders, or other work materials as in the molding of plastics, it is presently known to have one or more movable pistons operating rams against the work on or in a stationary bed, mold or die, and it has also been known to have ram or die adjustable for various positions during the work cycle, but so far as the molding of more intricate shapes is concerned, prior art difficulties have been most too numerous to mention. And with the prior art equipment even some very simple designs have ofttimes appeared impossible to press. For example if the work piece is to be a long cylinder, pressure applied radially at opposite places on the circumference causes a tangential pressure at quadrature points on the periphery resulting in uneven pressure and density, chipping, cracking and cleavage, and if, with prior art apparatus, it is attempted to press the piece only axially the great depth sets up a neutral axis and this (because of the great thickness of material in the direction of pressure application) again causes uneven pressure and densities and results in finished product chipping, cracking or cleavage. Heretofore, it has been concluded that press mechanism itself is inherently limited to simple short work piece designs so as not to cause uneven density during compacting (of powders or plastics), and for the more intricate shapes resort has had to be had to machining (with the consequent greater expense entailed) in order to fabricate the parts at all and particularly with commercially acceptable tolerances and strength. Further, with past press constructions and the types of control with which they have been used the "tooling" cost and set-up time per job has been prohibitively large insofar as making small runs of even simple shapes is concerned, and involved maintenance scheduling has been required. Further there have been other disadvantages in the past in connection with press control especially whenever elaborate work piece shapes are contemplated. Closed hydraulic systems have been known for some applications but they are bulky, they are adversely affected by temperature changes, and their time lag characteristics have been bad. Also in the past, it has been known to use involved contouring schemes (with disadvantage of being too fixed), or limit switch set-ups (which have been too complicated, costly and frail), or selsyns (which are bulky and add to initial expense and maintenance difficulties).

It is an object of the present invention to provide simple and inexpensive means for overcoming the above mentioned difficulties.

Another object of the invention is to eliminate the need for bulky control apparatus in a press capable of molding intricate shapes.

Another object of the invention is to provide an improved molding press and adequate control therefor suitable for the formation of metal powders or powders of plastics into intricate shapes with a minimum of set-up time.

Another object is to provide a general usage press with cylinder units infinitely positionable in both horizontal and vertical planes and capable of exacting pressures in both planes.

Broadly, the means employed in the embodiment herein illustrated and described comprises a hydraulic press having a plurality of double cylinders in both vertical and horizontal planes. At each double cylinder location there are a plurality of concentric pistons so that concentric pistons operate from the top, concentric pistons operate from the bottom and additional concentric piston sets come in from a plurality of sides to provide an arrangement with great versatility so far as the pressing of intricate shapes is concerned, also with a lessening of the danger of mold explosion because the horizontal and vertical multiple strokes give the advantage of more uniform pressure throughout the shape being molded. The pistons have attached rams or dies and are individually adjustable for various positions during the work cycle to provide the advantage of universality for a great number of jobs with a small tooling cost per job and little set-up time, and the controls necessary to provide these advantages includes piston operated means in remote position driving follower rheostats coordinated each in an electrically energized bridge circuit with a corresponding positioner rheostat. All positioner rheostats are driven in timed sequence from cams mounted on a common shaft driven by a motor, and the output of the various bridge circuits is amplified electronically and arranged to control pressure fluid to the respective pistons.

The arrangement and other objects and advantages will become apparent and the invention will be better understood from consideration of the following description taken in connection with the accompanying drawing, in which:

Fig. 1 is a perspective view of a molding press constructed in accordance with one aspect of the invention but with mold and plunger die elements removed to provide greater clarity of illustration;

Fig. 2 is an elevation section of one of the double cylinder-piston assemblies shown in Fig. 1;

Fig. 5 is a schematic control diagram illustrating control for either one of the pistons of any one of the double cylinder piston assemblies.

Figure 4:
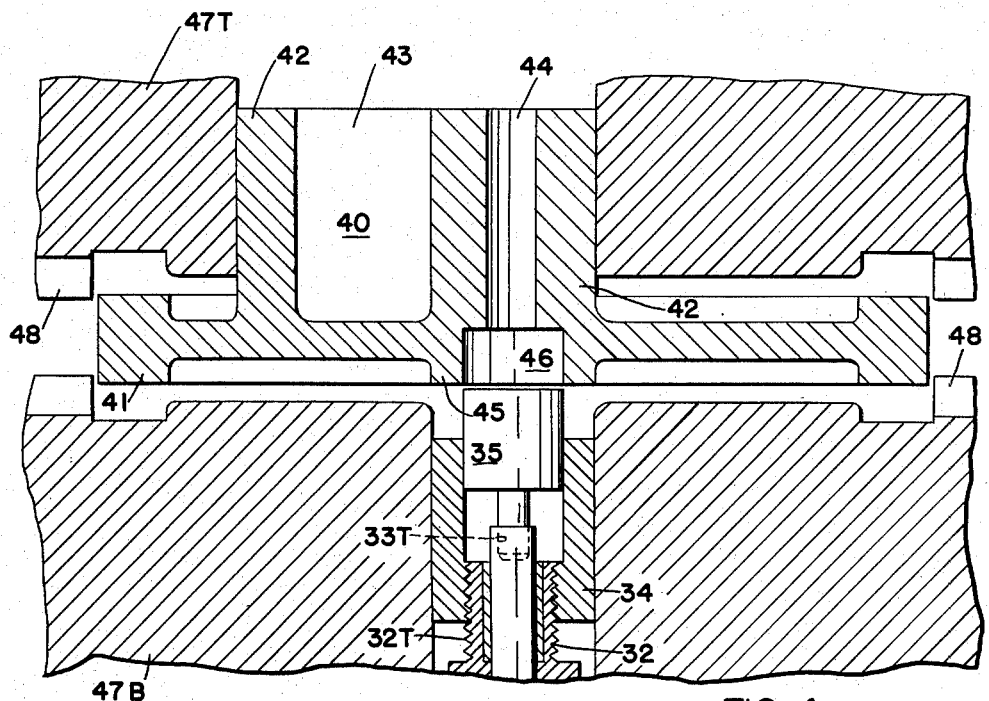
Fig. 4 is an elevation view of the workpiece of Fig. 2 and a sectional view of upper and lower mold elements designed for producing the same (the mold elements being shown distorted—expanded at some points and contracted at others—for clarity)

Referring first to Fig. 1, we have shown a general usage press and as will later more clearly appear it has cylinder units infinitely positionable in the horizontal and vertical planes and capable of exerting pressures in both planes. As shown, the press comprises a table having a base 10, a mold and horizontal cylinder supporting plate 11, and feet 12 intervening between base and support plate. Base 10 and support plate 11 may conveniently be made annular as shown and notched out at 10A and 11A, respectively, to accomodate the body of a human operator.

For clearness, the necessary mold, die, punch and core members are not illustrated in Fig. 1, but as shown the operating table 11 supports cylinder assemblies indicated generally at 21–24 for exerting pressures from four sides. Plate 11 also supports a bottom cylinder assembly 25 for exerting pressures upward, and plate 11 also supports two threaded posts 13 which in turn hold an upper plate 14 to which is secured an upper cylinder assembly 26 adapted to exert pressures downward.

As shown the base 10 and support plate 11 are provided with circular center openings, 10B and 11B, respectively, for accommodating the operation of the bottom cylinder assembly 25 which is assumed supported from the bottom of the plate 11 by bolt or other securing means (not shown).

The various cylinder assemblies 21–26 may be identical, or nearly so, and as seen in Fig. 2, each may comprise a forward or master cylindrical housing 28, and a concentric after cylinder 29. A piston 30 operates in the forward cylinder housing, and a piston 31 operates in the after cylinder, the master piston 30 being itself hollow and having a hollow connecting rod 32 while the after piston 31 operates a connecting rod 33 passing right through the master piston and its rod 32. The master piston rod 32 is provided at its end with external threads 32T and the afterpiston rod 33 is provided at its end with internal threads 33T so that the respective independently operating piston rods or rams are adapted to operate independent punch, die or whatever forming members are required at the particular location (see 34, 35 shown in broken outline to illustrate in Fig. 2 members as might be required for a more complicated workpiece than the "simple intricate" shape shown at 40 in Figs. 3 and 4.)

Referring again to Fig. 2, each of the pistons has a positioning control operating follower rod, 36, 37, respectively, passing right out the back end of the entire cylinder assembly. For simplicity, these follower rods are not concentric but are readily accessible at the rear of the respective cylinder assembly.

Thus, each of the cylinder assemblies 21–26 of Fig. 1 are double tandem units specifically constructed as such for greater versatility, with each such cylinder assembly consisting of a master cylinder with piston and ram and with one or more (though only one is shown) attached "after" cylinders whose rams operate in a sealed manner directly through the internal section of the respective master cylinder piston. Each such secondary or "after" cylinder makes the press much more universal and in general reduces die cost. Those skilled in the art will readily realize that with such an arrangement (of a master unit constructed in a manner that will accommodate an after cylinder or cylinders so that the ram of each after cylinder will operate independently and mechanically pass through the master cylinder piston) one of the members may readily be made to carry a mold or die portion and another made to carry a punch, for example for making a hole in the complete workpiece.

Figure 3:
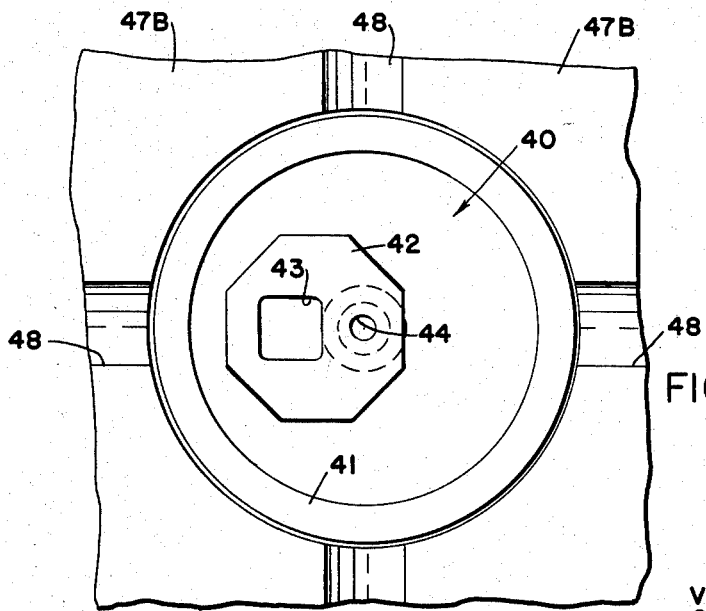
Fig. 3 is a plan view of an intricate finished workpiece and lower mold portion adapted to produce the same (in this view the mold is distorted—expanded—for clarity)

Thus, with a press having multiple cylinder assemblies as indicated in Fig. 1, and where each of the cylinder assemblies is a multiple unit of tandem design as indicated most clearly in Fig. 2, it is relatively easy to press, with substantially uniform densities and with little danger of mold explosion, the most intricate of shapes. Not intending to confuse by showing the most intricate possible shape, a simple "intricate," i.e. more intricate than generally known to the prior molding art, finished article is indicated at 40 in Figs. 3 and 4 where 41 is an outer annular flange, 42 is an upper boss containing both a rectangular opening 43 and an annular opening 44, and 45 is a lower boss having an annular opening 46 of a diameter different than that of the interconnecting upper annular opening 44. In Figs. 3 and 4, with exaggerated clearances bottom and top mold halves 47b, 47t, respectively, are shown having openings 48 provided between the various mold quadrants and for receiving die or punch members associated with the master and/or after units of the four horizontal cylinder assemblies. Since, with the illustrated embodiment, the part to be made is not of exceedingly intricate shape, the after cylinders of the horizontal units 21–24 need not be used to provide forming operations separate from those of their respectively associated master cylinder units. In such case it is often advantageous to use such after units each in parallel with its master counterpart to apply pressure on a single die element thus to give a greater total pressure when desired and when the after units are not needed independently. But at the top the master portion of cylinder assembly 26 may form the outer configuration of the top boss 42 and a liberal tolerance opening 43, while the after portion of the same assembly provides the opening 44, and meanwhile, at the bottom, the master unit of assembly 25 may form the outer configuration of the flange 45 while the after portion thereof produces the opening 46 communicating with the top opening 44, and all of the used units co-operate to provide acceptably uniform densities throughout the workpiece.

As hereafter more fully explained in connection with Fig. 5 each ram or die is adjustable for various positions during each work cycle, and is in fact substantially infinitely variable within the piston stroke, at least with the type of control hereafter described.

Referring to Fig. 5, the control unit includes A.C. power wires 51—52 (e.g., 220 volts, 60 cycle) which through a switch 53 energizes pilot motor 54. The pilot motor, through a variable speed unit VS, drives synchronized multi-cams 21 C1 (corresponding to 21 master) to 25 C2, corresponding to the master and after cylinders of the various cylinder assemblies of Fig. 1 and which may be assumed all mounted on a common shaft (so as to be synchronized) although only a few are shown in Fig. 5. The control and power supply unit also includes a hydraulic pump motor 55 driving a pump 57 to supply oil or other pressure fluid in a system to (for each unit) a solenoid operated control valve 58V and to the associated operating cylinder which (for this description) may be assumed to be the after cylinder 29 of the lower cylinder assembly 25 of Fig. 1. Other similar solenoid operated valves are provided for the other units.

Each solenoid operated control valve is of the type centered by springs (when de-energized) and is powered through a two-stage electronic control mechanism deriving its initial signal from unbalance in a bridge circuit. For the illustrated unit the bridge is indicated generally at 58B and as shown the bridge circuit is fed with a potential across its opposite ends from the secondary of a transformer 59 having its primary in circuit across lines 51—52. Each of the respective piston cylinder units has a bridge circuit (like 58B) comprising a positioner rheostat portion 60 tapped by a variable pointer 61 in accordance with operation of the respective one of the synchronized mechanical cams (such as 25 C2) the speed of which (in common with that of the other units) is readily adjustable to suit the desired condition, and the duration of effective operation of which (and the time of effective operation of which) is readily adjustable for the particular unit alone by merely changing the cam contour. The return action of rheostat pointer 61 (opposite to that effected by the cam) may be assured by a compression spring 62, and thus cams operating individual rheostats are operated in sequence as necessitated to form the positioner function of the control mechanism.

For each unit the bridge also comprises a follower rheostat portion 63 engaged by a follower rheostat pointer 64 operated by cam or pinion means from the cylinder back end control rod, as shown by a rack (37R) and pinion (37CC, and 37C) drive so that the follower rheostat pointer 64 will affect the bridge 58B properly in accordance with position of the corresponding piston control rod 37. Of course other means could be used instead of a rack and pinion, e.g. a rheostat pointer could be carried directly by control rod 37.

Unbalance of the bridge is taken out through wires 65, 66 (connected to rheostat pointer 61 and the pointer 64, respectively) to feed a first amplifier stage which in the illustrated embodiment comprises a twin purpose tube 67. The tube filaments are heated in normal manner and the tube cathodes are tied together and to ground and to the mid-point of a resistor 68 the ends of which are respectively connected to the wires 65, 66, which in turn are connected to the grids so that the halves of resistance 68 provide grid bias to the respective sides of the tubes 67 in accordance with the amount of unbalance on the bridge.

The second amplifier stage comprises another twin purpose tube 69. For each half of this tube independently adjustable sensitivity controls 71, 72, respectively, comprise rheostats for adjusting the cathode bias with respect to the grounded leg of the 220 volt circuit. Outputs of the first stage from the respective plates of the tube 67 are taken as input to the grids of the tube 69 of the second stage and also tied to the ungrounded A.C. line 51 through resistors 73, 74. Each half tube amplifies during its own positive cycle portion so that the A.C. supply becomes in effect pulsating D.C. supplied to the plates of the first tube 67 through the resistors 73, 74, respectively, and to the plates of the second tube 69 through the windings 75, 76, of a solenoid relay having contacts 77, 78, respectively. This relay (75—78) may be of the well known three way switch type having gravity, or spring or other means for bringing it to rest in a mid-position when both coils are equally energized (or de-energized) or if desired separate relays might be used. As shown, relay 75—78 selectively energizes solenoids of the hydraulic valve 58V, though alternatively, if desired, the output of the control system could be used to actuate a reversible electric motor, but in any event the positioner and follower form a fundamental bridge circuit for which an amplifying circuit is supplied and the output of the amplifier actuates means for actuating the device being followed. In the illustrated embodiment, relay coils 75 or 76 (when energized) closes relay contacts 77 or 78 to energize one or the other of the solenoid valve 58V coils 79, 80. Condensers 81, 82 may be used to smooth out the ripple of the rectified voltages which serve to operate the respective relay solenoids 75, 76 and the electrical control is complete as soon as leads (e.g., at 83B—83D are taken out to other similar units for operating the pistons of the eleven other cylinders). These leads are all of the same (opposite to ground) polarity so that only a minimum of wiring is required between units.

Suitable piping 85 is taken from the hydraulic pump 57 (or other pressure fluid source) to each solenoid operated control valve 58V, and piping 86 extends from valve 58V to the cylinder 29 at opposite sides of its piston 31. Through interconnecting means in the valve cylinder (such as a groove 87 in its piston) fluid from one end or the other of the operating cylinder is returned through a conduit 88 to the source.

In operation, for all units the individual cams 21 C1, etc., operate individual rheostats as necessitated to form the positioner functions. Since the amplifier responds to the differences in positioner follower relationship, for each unit any movement of positioner will result in a corresponding movement of the follower, for whenever positioner and follower are not in corresponding positions a grid bias signal will be amplified first through the first tube and then through the second. On this first tube the bias is controlled for one grid by the pilot motor cam operated linear slidewire rheostat or positioner, and for the other grid by the rotary rheostat coupled to the piston follower rod, though of course either could be slidewire or rotary rheostat. For the second tube the cathode bias (and thus in effect the grid bias) is, for each tube half, independently adjustable through manual manipulation of the sensitivity controls.

Quite probably a circuit as shown operates not so much on voltage change as on change of phase but whether or not this is true, one outstanding advantage of the arrangement is that either linear slidewire or rotary rheostats (and of any length or size) can be used for either of the positioner follower functions and no bulky parts (such as selsyns or hydraulic follower systems) are involved. Of course in the broader aspects of the invention either inductance or capacitance (instead of resistance) could be varied in one (or both) legs of the bridge circuit and such an arrangement would have the advantage of non-wearing parts but possibly not as great sensitivity.

The control system has the advantage of not requiring any rectifiers, still the output of the electronic circuit is D.C. although this is a modulated D.C. so that it may be desirable to use condensers (81, 82) to keep the relays from chattering.

The tandem cylinder piston arrangement (see Fig. 2) is believed to have many industrial uses, for example wherever cylinders require multiple concentric action as where a die member moves in a mold member or tool in one direction while another die member, or the mold member, or tool, moves in an opposite direction (or spaced apart in time in the same direction). The double (or, if desired, triple, quadruple, etc.) unit is constructed for such type of use, and in connection with the present application it will be apparent that such an arrangement allows the pressing of more intricate shapes which previously had to be cast, and then machined, a costly operation. For wherever there is a plurality of assemblies each comprising a master cylinder and one or more after cylinders operating in such manner that the rams of the two will operate independently one through the other, intricate and/or large shapes may be pressed and without any need for subsequent machining, particularly where the plurality of such tandem assemblies are used to exert pressures in various planes, for example as with the arrangement shown in Fig. 1 where pressure may be applied from four sides and from top and bottom and by two different members in each of these directions, and where, as with the system of control disclosed in Fig. 5, each of the rams is infinitely variable within its operative length.

To fully comprehend this last mentioned infinitely variable feature, it has to be understood that with the control shown the operating piston 31 may be stopped at any point in its stroke, and started from any point. That is, if positioner cam 25 C2 forces pointer 61 upward from the position shown and it be assumed that for operative half cycles this will allow top half of tube 67 to pass more current to its top plate so that IR drop in resistance 74 increases, there will be a lowering of the grid to cathode bias on top half of tube 69, the top half of tube 69 will pass more current and when coil 76 is sufficiently energized, contact 78 will close (particularly since the very opposite effects have meanwhile been occurring in the bottom half circuits, so that coil 75 is, if anything, becoming less energized). Contact 78 closing energizes coil 80 pulling the valve piston in such direction as to allow pressure fluid to enter one end and discharge from the other end of cylinder 29, to move piston 31. But as piston 31 travels the follower drive (37R, 37CC, and 37C) drive pointer 64 for example upward decreasing the voltage difference between wires 65 and 66 until such a point is reached that coil 76 is sufficiently de-energized and coil 75 sufficiently energized that the relay will go again to mid-position, the valve piston will go again to mid-position, and the after cylinder piston 31 will stop wherever it then happens to be and will be held in that position by the pressure fluid at opposite sides of the piston because the hydraulic lines are all closed.

There is thus provided means for pressing the most intricate of shapes (for example much more intricate than the shape shown by way of example in Figs. 3 and 4), means for permitting a great number of different jobs with a small tool cost per job and very little set-up time, and means for assuring more uniform hydraulic and hence mold pressures so that a higher quality product results with less fear of its subsequent breakage and with less danger of mold explosions. Flexibility of set up is assured not only by using the cam contours, which can be changed without too much effort, but also by the sensitivity controls (for tube 69 in the arrangement as disclosed in Fig. 5) which permit individual adjustment for the various pistons operating in the various directions at various times during each work cycle. Thus all of the cylinder piston rams of the press are easily though substantially infinitely positionable within their stroke range, and we have found this may usually be done from a single remote position (because only the dual cathode rheostats need normally be adjusted—and they can be readily mounted all together, for all units), and if anything more needs to be adjusted, i.e. for a new "run" for a different work-piece, at most this will only require a new set of cams but they too are all together (on one shaft), and shaft sections collared together can be used to allow quick replacement for job 2, job 1, job 3, job 2, etc.

While we have illustrated and described a particular embodiment of our invention, various modifications may obviously be made without departing from its true spirit and scope which we intend to define in the appended claims.

We claim:

1. A workpiece molding press comprising a pair of horizontal table members, means mounting said table members in vertical separation so as to provide a space between them for mounting a workpiece to be molded, a plurality of substantially identical cylinder units mounted in opposed pairs of aligned units on said table members, each unit comprising a master cylinder and an after cylinder arranged in tandem alignment and disposed with the front end of the master cylinder adjacent the center of said space and the after cylinder extending away from said space, said pairs of cylinder units comprising at least one pair arranged in vertical alignment, with the master cylinders thereof directed toward said space through openings in said table members, and at least one pair of cylinder units arranged in horizontal alignment, and each of said units including a piston and a piston rod in each of the cylinders of the unit, the master cylinder piston rod being hollow and the after cylinder piston rod extending through it and both piston rods having front ends adjacent said workpiece mounting space, work piece forming tool elements mounted on said piston rod front ends, and control means for selectively actuating the pistons of said pairs of cylinder units.

2. A work piece molding press as claimed in claim 1 in which a plurality of cylinder units are mounted in a plurality of pairs on the lower table member with the cylinders of each unit radiating from the center of the space between the table members.

3. A workpiece molding press as claimed in claim 1 in which a single pair of cylinder units are disposed in vertical alignment, with the front ends of the respective master cylinders of said units disposed adjacent openings formed substantially centrally in said table members.

4. A workpiece molding press as claimed in claim 1 in which a plurality of cylinder units are mounted on a plurality of pairs on the lower table member with the cylinders of each unit radiating from the center of the space between the table members, and in which a single pair of cylinder units are disposed in vertical alignment, with the front ends of the respective master cylinders of said vertically aligned units disposed adjacent openings formed substantially centrally in said table members.

5. A workpiece molding press as claimed in claim 1 in which a single pair of cylinder units are disposed in vertical alignment, with the front ends of the respective master cylinders of said units disposed adjacent openings formed substantially centrally in said table members, and in which a plurality of cylinder units are mounted in a plurality of pairs on the lower table member with the cylinders of each unit radiating from the center of the space between the table members and with the front ends of the piston rods of said radiating cylinders disposed outwardly beyond the opening in the lower table member when the pistons of said radiating cylinders are in fully retracted position, whereby the margin of the opening in the lower table member provides support for a workpiece engaged by tool elements mounted on the piston rods of said radiating cylinders.

References Cited in the file of this patent

UNITED STATES PATENTS

| | | |
|---|---|---|
| 1,207,673 | Willard | Dec. 5, 1916 |
| 1,352,160 | Willard | Sept. 7, 1920 |
| 2,300,302 | Morin | Oct. 27, 1942 |
| 2,302,593 | Bean et al. | Nov. 17, 1942 |
| 2,333,393 | Ryder | Nov. 2, 1943 |
| 2,454,661 | Lester et al. | Nov. 23, 1948 |
| 2,567,715 | Keusch et al. | Apr. 11, 1951 |
| 2,675,581 | Payne | Apr. 20, 1954 |